(12) United States Patent
Tijerina Ramos

(10) Patent No.: US 12,012,351 B2
(45) Date of Patent: Jun. 18, 2024

(54) ROTOLINEAR MECHANISM FOR GLASSWARE FORMING MACHINES

(71) Applicant: Vitro, S.A.B. de C.V., Monterrey (MX)

(72) Inventor: Victor Tijerina Ramos, Monterrey (MX)

(73) Assignee: Vitro, S.A.B. de C.V., Nuevo León (MX)

( * ) Notice: Subject to any disclaimer, the term of this patent is extended or adjusted under 35 U.S.C. 154(b) by 92 days.

(21) Appl. No.: 17/622,478

(22) PCT Filed: Jun. 26, 2019

(86) PCT No.: PCT/MX2019/000076
§ 371 (c)(1),
(2) Date: Dec. 23, 2021

(87) PCT Pub. No.: WO2020/263068
PCT Pub. Date: Dec. 30, 2020

(65) Prior Publication Data
US 2022/0267185 A1   Aug. 25, 2022

(51) Int. Cl.
C03B 9/00    (2006.01)
C03B 9/16    (2006.01)
C03B 9/193   (2006.01)
C03B 11/00   (2006.01)

(52) U.S. Cl.
CPC ............ C03B 9/165 (2013.01); C03B 9/1932 (2013.01)

(58) Field of Classification Search
CPC .................................................... C03B 9/165
See application file for complete search history.

(56) References Cited

U.S. PATENT DOCUMENTS

| 3,383,193 | A |   | 5/1968  | Bailey |
|-----------|---|---|---------|--------|
| 4,120,683 | A |   | 10/1978 | Irwin  |
| 4,528,017 | A |   | 7/1985  | Abbott et al. |
| 4,705,552 | A | * | 11/1987 | Liska ................. G05B 19/0426 700/12 |
| 5,928,400 | A |   | 7/1999  | Meyer et al. |
| 5,974,835 | A | * | 11/1999 | Lovell ...................... C03B 9/16 65/261 |

FOREIGN PATENT DOCUMENTS

| CN | 101838100 A  |   | 9/2010  |             |
|----|--------------|---|---------|-------------|
| CN | 105753298 A  |   | 7/2016  |             |
| EP | 915269 A1    | * | 5/1999  | ............ C03B 9/165 |
| ES | 470446 A1    |   | 6/1978  |             |
| GB | 2134509 A    |   | 1/1983  |             |
| GB | 2331086 A    |   | 11/1998 |             |
| JP | 59-141431 A  |   | 8/1984  |             |
| JP | 60-118633 A  |   | 6/1985  |             |
| JP | 3-265526 A   |   | 11/1991 |             |
| JP | 11-199241 A  |   | 7/1999  |             |
| JP | 2019-81668 A |   | 5/2019  |             |

* cited by examiner

*Primary Examiner* — Erin Snelting
(74) *Attorney, Agent, or Firm* — The Webb Law Firm

(57) ABSTRACT

The present invention relates to a roto-linear mechanism for a glassware forming machine adapted to be connected to a funnel-holding arm, a shutter arm, an arm for a blowing head or a similar mechanism, to simultaneously perform an axial and radial movement to each of such arms from a first position to form glass articles to a second position outside the forming process thereof.

8 Claims, 3 Drawing Sheets

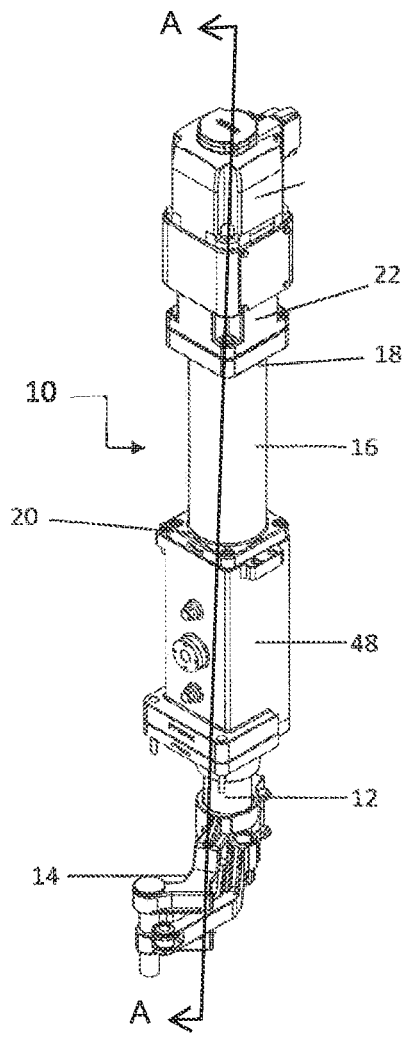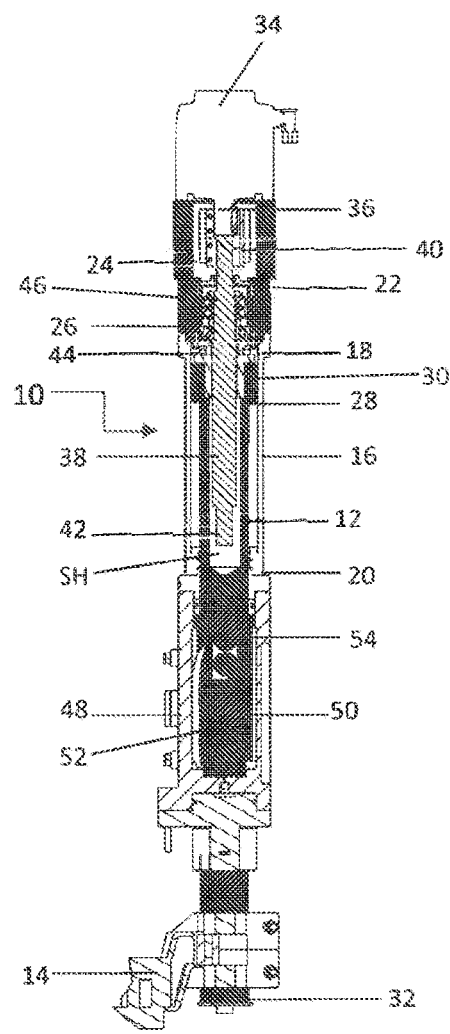
FIG. 1
FIG. 2

ROTOLINEAR MECHANISM FOR GLASSWARE FORMING MACHINES

CROSS-REFERENCE TO RELATED APPLICATION

This application is the United States national phase of International Application No. PCT/MX2019/000076 filed Jun. 26, 2019, the disclosure of which is hereby incorporated by reference in its entirety.

FIELD OF INVENTION

The present invention relates to mechanisms used in a glassware forming machine and, more particularly to a rotolinear mechanism for a glassware forming machine, which can be adapted to connect a funnel-holding arm, a shutter arm, an arm for a blowing head or a similar mechanism.

DESCRIPTION OF RELATED ART

Glassware such as glass containers are usually produced on glassware forming machines such as those which may include multiple similar individual forming sections, by means of the blow-blow and press-blow processes, for the manufacture of wide-mouth and narrow-mouth containers such as bottles, glasses and other glassware. These are produced on the forming machines known as "E", "F", "SF" Series of Pneumatic, Servo-pneumatic and Full servo technology.

During the containers manufacturing process by means of the blow-blow or blow press process, the glass in the form of gob is introduced into a parison or preformed mold in the parison forming station, where, depending on the process, the gob settles by means of a blowing or vacuum process to the lower part of the parison mold to form the crown of the container. Then, once the container crown is formed, a counter-blow is made to form a parison or preform of the container. Subsequently, the container preform is transferred by a reversing mechanism with a 180 degree movement of the parison mold to a final blow mold of the forming station or final blow mold, where final shape is given to the container.

Lastly, the newly formed container is transferred by a conveyor belt mechanism to a tempering oven where it is decorated or packaged afterwards.

During the parison forming sequence, there are similar mechanisms that move in a vertical (up and down) and radial movement to the left and to the right using a mechanical cam, to position on the container preforming line, for example, in the blow-blow process of container parison forming, there is a funnel mechanism which is positioned over the mold to guide the gob into the pre-mold cavity. After the glass gob is delivered, a sealing mechanism (on the funnel) is positioned to perform a settling blow to ensure the glass gob settles on the bottom of the mold forming the glass crown of the container, as well as to ensure uniform contact of the glass with the walls of the parison mold.

After setting, the sealing mechanism and the funnel mechanism are removed from the upper part of the mold and the sealing mechanism re-enters the mold to position itself with a vertical and radial movement on the upper part of the mold to form the base of the container. This base is formed by means of a counterblow coming from the lower part of the mold where the crown of the container is formed by the molding piston.

Once the parison is formed, it is transferred by a reversing mechanism and placed in a final blow mold for the final forming of the container. A blow head mechanism is positioned by a roto-linear motion over the top of the mold to give a final shape to the container.

From the above process, as can be seen, both, the funnel mechanism, sealing mechanism and blow head mechanism move with alternating roto-linear movements—according to the container forming sequence—from an initial position to form the container to a second position outside the container forming process.

For example, U.S. Pat. No. 3,383,193 assigned to Maul Brothers relates to an apparatus for forming hollow glass articles wherein, a plug is brought into an operating position toward one end of a mold cavity by means of the interco-operation of a cam, a cam follower mechanism, a telescoping pin and orifice arrangement. The pin and holes absorb vibrations and extend the life of the device.

U.S. Pat. No. 5,928,400 assigned to Emhart Industries shows a mounting structure to be used in a glassware forming machine for moving an operating attachment, such as a funnel, a shutter or a blow head, between separate operating positions. The machine comprises a vertical operating shaft and a parallel support shaft and, the mounting structure comprises a first link mounted in an adjustable manner on the operating shaft and a second link mounted in a sliding manner on the support shaft. The two links are hinged to a spindle and form a parallel linkage with it. A key and keyway, keeps the first link in a desired angular ratio to the operating shaft. The spindle is provided with a releasable device by means of which the operating attachment can be secured to the spindle in a desired angular ratio.

However, by increasing the number of forming stations, the number of forming molds and surrounding equipment (whether for single or multiple cavity) increases consecutively, thus increase the cost of machine operation.

Usually, a transfer mechanism mainly consists of: a blow head or a sealing head or a funnel, which are coupled by means of an arm to an upper end of a piston rod. The piston rod is coupled through its intermediate part to a piston, which moves with an upward or downward movement inside a cylinder. The cylinder-piston assembly being attached to the machine structure. A cap closes the top of the cylinder, with the piston rod projecting above the cap. The piston rod that has the arm is coupled at its upper end to a support to rotate on its own axis in this support.

A cam follower is connected to the lower end of the piston rod, which in turn is coupled to a cylindrical housing having a traveling or translating cam groove. The cam follower is in contact with the sides of the cam groove.

Therefore, when the piston rod moves upward (due to the movement of the piston), the mechanism arm will move upward with a linear movement and then move inward with an angled movement until it positions itself above a mold. At this point, the blow head or any other element moves down with a vertical movement to perform a blowing or forming function and then, once the corresponding stage is completed, it moves vertically upward to separate from the mold, and returns with an angled outward movement. That is, during the forming process, the arm follows the angular path inward and outward by means of the piston rod and cam follower, through the path of the transfer cam groove being formed in the cylindrical housing.

The cylinder-piston assembly in some cases is a pneumatic cylinder with a hermetically sealed cylinder liner contains a piston that divides the interior of the liner into two isolated chambers on which the compressed air acts. As compressed air is injected at a certain pressure through one of the intakes of one of its chambers, the air exerts a force on the piston, causing it to move along its entire stroke, bringing the piston to its opposite position.

However, even though mechanisms for forming articles already exist, some still use the cylinder-piston concept to move a rod up and down, combined with an angled movement. These require a series of valves and inlet ports to feed air flows into the cylinder chamber, the use of springs to support the return of the valves to their original position, as well as the use of cams to provide the required angle movement.

Notwithstanding the above, one of the main problems of this type of mechanism is that, due to its constant movement, the parts wear out causing, although in a slight degree, a desynchronization in the movement of the arm causing slight knocks during the coupling of the blow head, shutter, etc., on the mold.

In addition, this kind of mechanism should be easy to build and easy to repair, to ensure proper performance of its positions according to the forming cycle of the machine.

Furthermore, it is important to note that the roto-linear mechanisms are mounted on top of a support frame, limiting the operation of the cooling systems.

Therefore, in order to simplify the already known mechanisms and achieve a better efficiency in their performance, as well as improving the efficiency in their maintenance, by standardizing the mechanisms which perform similar tasks, and equipping them only with their specific instruments to perform their tasks thereof, minimizing as much as possible the cost of equipping a machine, the number of mechanisms and parts "SKU" (stock-keeping unit) in stock, and simplicity in the assembly of the specific instruments of common mechanisms and apparatus, the present invention relates to a roto-linear mechanism which can be used for the guide funnel, the shutter and the blow head, in a left or right arrangement for any of them.

In addition, by using this type of mechanism the latest technological developments benefit from optimized motion damping. This type of mechanism allows translation and rotation movements of the funnel arms, shutter or blow head. Adjustable by +/−1°, the angle of rotation provides the mechanism with great flexibility and variety of functions. As a result, we have a funnel, shutter and blow head mechanism, which produces optimized products in all the molding connections in which it intervenes.

In addition, due to its arrangement, the rotolinear mechanism can be placed on top of the machine structure.

SUMMARY OF THE INVENTION

Therefore, the main objective of the present invention is to provide a roto-linear mechanism for glassware forming machines, which can be easily adaptable to operate a blow head, shutter or funnel, in a process of forming glassware by means of the blow-blow, press-blow and direct press process.

An additional objective of the present invention is to provide a roto-linear mechanism for glassware forming machines, which can be easily adjusted according to the different heights of the articles to be produced.

An additional objective of the present invention is to provide a roto-linear mechanism for glassware forming machines, which reduces the number of manufacturing parts and consequently its manufacturing cost.

Another objective of the present invention is to provide a roto-linear mechanism for glassware forming machines, which suppresses the rotational vibrations of the blow head arm, shutter or funnel by preventing malfunction thereof.

Another objective of the present invention is to provide a roto-linear mechanism for glassware forming machines, by using a double cam follower, a continuous contact on the cam track is ensured, achieving a longer service life, by distributing the inertial load on the two followers and therefore, a greater precision in the movement of the blow head arm, shutter or funnel, thus extending the useful life of the same.

An additional objective of the present invention is that rotolinear mechanisms can be mounted on the upper part of the machine, providing a view and access to all elements and mechanisms mounted on the section, improving the operating efficiency of the machine.

As a further objective of the present invention is that, if this is mounted on top of the machine, the performance of the mold cooling systems is maximized by increasing the machine speeds.

An additional objective of the present invention is that, using the arrangement at the top mounting of the roto-linear mechanisms, short lengths of the arms used in the variable equipment of the container forming machine are achieved, avoiding deflection of arms and consequently malfunction in the connection of the mechanical elements with the molding. These and other objectives of the present invention will be evident to experts in the field of the following detailed description.

BRIEF DESCRIPTION OF THE DRAWINGS

FIG. 1 is a conventional perspective view of the roto-linear mechanism for glassware forming machines in accordance with the present invention;

FIG. 2 is a cross-sectional view along line A-A of FIG. 1, of the rotolinear mechanism for glassware forming machines;

DETAILED DESCRIPTION OF THE INVENTION

Figures 3, 4:
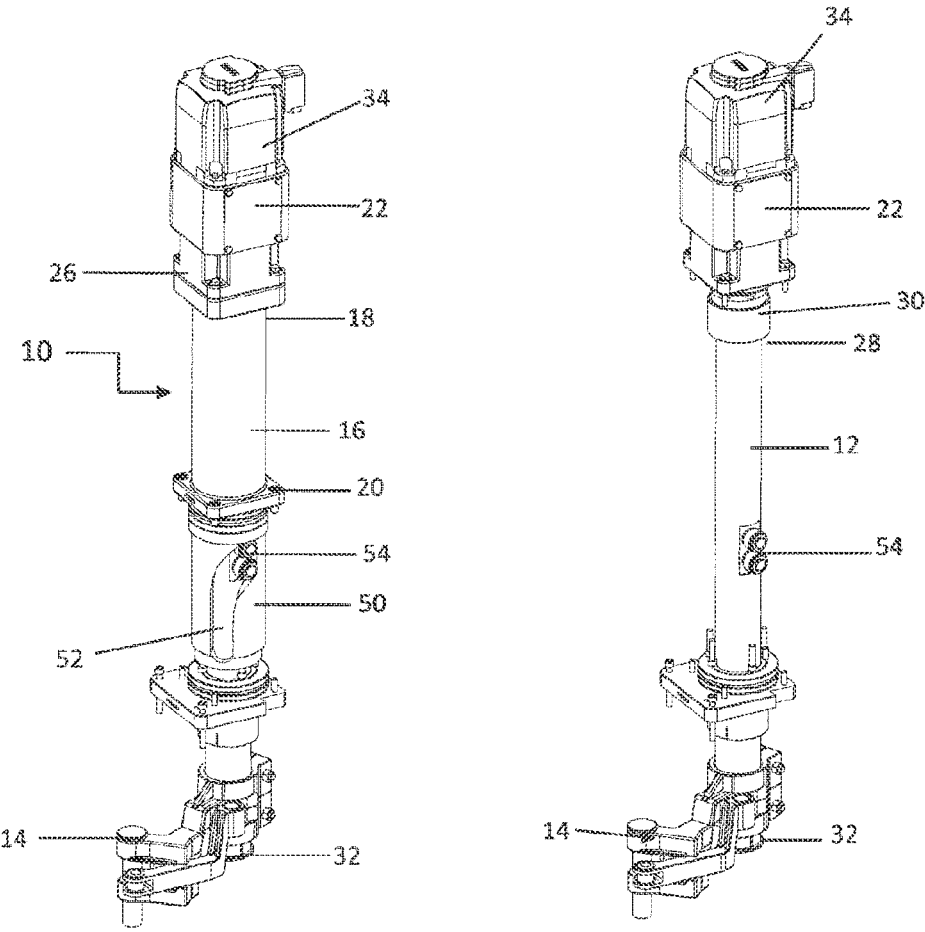
FIG. 3 is a perspective view, showing a first section in detail of the rotolinear mechanism of the present invention.
FIG. 4 is a perspective view, showing a second section in detail of the rotolinear mechanism of the present invention; and, FIG. 5 is a perspective view, in detail, showing a cam follower of the rotolinear mechanism of the present invention.
Figure 5:
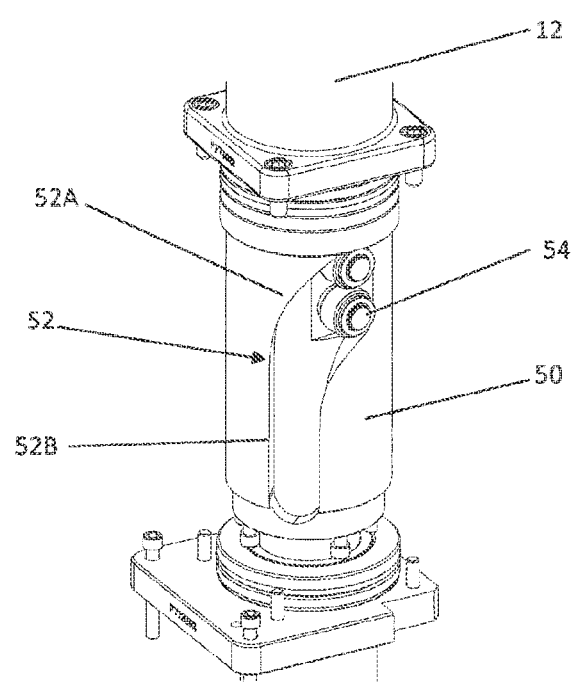

For a better understanding of the invention, only the rotolinear mechanism 10 for glassware forming machines will be described, without showing the rotolinear mechanism 10 coupled to a blow head, shutter or funnel.

As shown in FIG. 1, the rotolinear mechanism 10 for a glassware forming machine is primarily used to simultaneously move a shaft 12, with an axial movement, as well as, an arm 14 with a radial movement to the left or to the right. The shaft 12 is connected to the arm 14. The arm 14 can be a funnel holder arm, a shutter arm or an arm for a blow head of the forming machine, which moves between an article forming position and a non-article forming position. Shaft 12 has a hollow passage SH, as illustrated in FIG. 2, which is formed from the top to about half of the total length thereof. A spring (not shown) can be located in shaft 12 for safety purposes in case of absence of electric current. In the case of the absence of an electric current, the stored force of the compressed spring causes the shaft to move in an upward position and avoid any accidental shock.

Referring now in detail to each of the parts of the rotolinear mechanism 10 of the present invention, there is shown a cylindrical housing 16 having an open upper end 18 and an open lower end 20. A support structure 22 having an axial passage 24, such support structure 22 is coupled by its lower part 26 to the upper end 18 of the cylindrical housing 10. Shaft 12 being located inside housing 16; the upper end 28 of shaft 12 including a ring or annular section 30 of a larger diameter, to slide over the inner surface of housing 16 between an upper position and a lower position bounded by the upper end 18 and the lower end 20 of the housing 16. The shaft 12 extends at its lower portion 32 beyond the lower end 20 of cylindrical housing 16.

A servomotor or rotolinear actuator or stepper motor 34 having a shaft section 36, such servomotor 34, is located on top of the support structure 22. A recirculating shaft or ball screw 38 having an upper end 40 is connected to the shaft section 36 of the servomotor 34 and a lower end 42. The screw 38 is located vertically within the hollow passage SH of shaft 12 to rotate about its own axis with a rotational movement to the left or to the right. A nut 44 of the ball screw 38 is fixedly engaged in the ring or annular section 30 of the shaft 12 to convert the rotational movement of the screw 38, leftward or rightward to a linear movement upward or downward of the shaft 12. The screw 38 is coupled into the support structure 22 by means of bearings 46, which are located in the axial passage 24 in such support structure 22.

A cam sleeve or cam cover 48 is located at the bottom of the cylindrical housing 16, which is coupled to the lower end 20 of the housing 16. A drum cam 50 having a cylindrical or axial cam profile 52 is located fixedly within the cam cover 48. A pair of cam followers 54 is coupled to approximately the middle portion of shaft 12. Shaft 12 is located through drum cam 50. The cam followers 54 are located in continuous contact on the cam profile track 52, of drum 50. The cam profile 52, having a curved leg 52A for causing an angular displacement or twist to the shaft 12, leftward or rightward by about or about 47° and a straight leg 52B for generating an upward or downward movement of the same shaft 12 to engage or disengage about the top of a mold (not shown). The advantage of using two cam followers is to ensure continuous contact on the cam track, eliminating vibrations during rotation and providing greater durability by spreading the inertial load over the two followers.

As can be seen from the foregoing, there is described a roto-linear mechanism 10 which may be used with a funnel arm, a shutter arm or a blow head mechanism, which may be located on the bottom of an I.S. machine or may be mounted on an upper support beam (not shown) of the same machine so that, such roto-linear mechanism 10 may swing the arms in two different ways.

Considering as an example the movement of an arm 14 of a funnel (not shown), when the roto-linear mechanism 10 is located at the bottom or base of the I.S. machine, once a forming mold is closed, the servomotor 34 moves the screw 38 with a rotational movement (to the left or to the right depending on the position of the mechanism) and the shaft 12 moves with a rotation of approximately 47° in accordance with the curved section 52A of the cam 52, until it is positioned above a mold. At this point, the shaft 12 and the arm 14 attached to one end of the shaft 12 moves downward in a vertical downward motion (due to the profile or straight section 52B of the cam 52) to produce an upward or downward motion to allow a gob of glass to pass from a funnel into the mold. Subsequently, once its corresponding stage is completed, the arm 14 moves vertically upward to separate from the mold, and returns with an outward angular movement. That is, during the forming process, the arm 14 follows the angled path inwardly and outwardly by means of the shaft 12 and cam follower 54, through the path of the transfer cam groove 52 which is formed in the drum cam 50.

If the rotolinear mechanism 10 is located on the top or on the support beam of an I.S. machine, once a forming mold is closed, the servomotor 34 moves the screw 38 with a rotational movement (to the left or to the right depending on the position of the mechanism) then, shaft 12 moves downward, until a tool holder arm (not shown) is positioned above a mold. At this point, a funnel (not shown) and arm 14 lowers with a vertical downward movement to allow a gob of glass to pass into the mold. Subsequently, after completing its corresponding stage, shaft 12 (and its corresponding arm 14) moves vertically upward to separate from the mold, and returns with an outward angular movement.

Therefore, although a specific embodiment of a rotolinear mechanism 10 has been described for use in funnel, shutter or blow head mechanism arms of a glassware forming machine, however, such a mechanism can be used in any equipment having a similar sequence of motion and, therefore, it will be apparent to those skilled in the art that many other features or improvements could be made which may be considered within the field determined by the following claims.

The invention claimed is:

1. A rotolinear mechanism for a glassware forming machine adapted to be connected to a funnel holder arm, a shutter arm, or an arm for a blowing head for simultaneously performing an axial and radial movement to each of the arms from a first position for forming articles to a second position outside of a forming mold for forming the articles, the rotolinear mechanism is characterized by:
    a first housing having an open upper end and an open lower end;
    a first shaft having an upper end and a lower end, the first shaft located in alignment with an internal part of the first housing to internally slide in the first housing, between the first position and the second position, the first shaft includes a hollow passage formed from a top of the shaft to about half of the total length thereof; the first shaft having a lower part that extends beyond the open lower end of the first housing; the funnel holder arm, shutter arm, or arm for a blowing head is attached to the lower end of the first shaft;
    cam follower means attached to an outer periphery of the first shaft, the cam follower means is located below the open lower end of the first housing;
    linear actuating means coupled in the hollow passage of the first shaft, for converting a rotational motion into a linear motion, the linear actuating means have an upper end and a lower end, the lower end of the linear actuating means located within and ending in the hollow passage of the shaft at a location above the cam follower means;
    drive means coupled to the upper end of the linear actuating means, to provide a swiveling movement to the actuating means causing the actuating means to move in a radial direction with respect to a longitudinal axis of the first shaft and moving the first shaft between the first position and the second position within the first housing; and,
    a second housing fixedly connected to the open lower end of the first housing, the second housing includes a cam profile, the cam follower means is located in continuous contact on the cam profile to cause an angular displacement of the first shaft and of the arm in the radial direction, during an upward or downward movement of the first shaft.

2. A rotolinear mechanism for a glassware forming machine according to claim 1, characterized in that the drive means is a servomotor.

3. A rotolinear mechanism for a glassware forming machine according to claim 1, characterized in that the drive means is a stepper motor.

4. A rotolinear mechanism for a glassware forming machine according to claim 1, characterized in that the drive means is a rotolinear actuator.

5. A rotolinear mechanism for glassware forming machine according to claim 1, characterized in that the second housing is covered by a cam cover.

6. A rotolinear mechanism for glassware forming machine according to claim 1, characterized in that the cam follower means is a double cam follower.

7. A rotolinear mechanism for a glassware forming machine according to claim 1, characterized in that the linear actuating means is a ball screw.

8. A rotolinear mechanism for a glassware forming machine according to claim 1, characterized in that the drive means is located above the open upper end of the first housing and the upper end of the first shaft and the rotolinear mechanism is configured to be mounted on an upper portion of the glassware forming machine.

* * * * *

UNITED STATES PATENT AND TRADEMARK OFFICE
CERTIFICATE OF CORRECTION

| | |
|---|---|
| PATENT NO. | : 12,012,351 B2 |
| APPLICATION NO. | : 17/622478 |
| DATED | : June 18, 2024 |
| INVENTOR(S) | : Victor Tijerina Ramos |

It is certified that error appears in the above-identified patent and that said Letters Patent is hereby corrected as shown below:

In the Claims

Column 6, Line 47, Claim 1, delete "head is" and insert -- head --

Column 7, Line 15, Claim 5, delete "for" and insert -- for a --

Column 7, Line 18, Claim 6, delete "for" and insert -- for a --

Signed and Sealed this
Tenth Day of September, 2024

Katherine Kelly Vidal
*Director of the United States Patent and Trademark Office*